Y2587 OR 3,984,658

United States Patent [19] T235/382

Cannon

[11] 3,984,658

[45] Oct. 5, 1976

[54] PROGRAMMABLE CARD ACTUATED LOCK

[76] Inventor: John W. Cannon, 7129 Gerald Ave., Van Nuys, Calif. 91406

[22] Filed: Sept. 26, 1975

[21] Appl. No.: 617,231

[52] U.S. Cl. 235/61.7 B; 70/263; 317/134; 340/147 P; 340/149 A

[51] Int. Cl.[2] G06K 5/00; E05B 53/00; H01H 47/00; H04Q 1/00

[58] Field of Search 235/61.7 B; 340/149 R, 340/149 A, 147 R, 147 P; 70/263, 264, 265; 317/134

[56] References Cited

UNITED STATES PATENTS

| | | | |
|---|---|---|---|
| 3,450,953 | 6/1969 | Gardner | 317/134 |
| 3,596,250 | 7/1971 | Sedley | 340/167 R |
| 3,622,991 | 11/1971 | Lehrer et al. | 340/147 R |
| 3,702,392 | 11/1972 | St. Jean | 235/61.7 B |
| 3,842,629 | 10/1974 | Pazer | 70/264 |
| 3,857,018 | 12/1974 | Stark et al. | 235/61.7 B |
| 3,938,091 | 2/1976 | Atalla et al. | 235/61.7 B |

*Primary Examiner*—Daryl W. Cook
*Attorney, Agent, or Firm*—Harris, Kern, Wallen & Tinsley

[57] ABSTRACT

An access control device operated by a magnetically coded card. A self-contained unit with card receiving slot, card reader, memory and logic and control circuitry in a single small package. An access control device providing a unique number for each issued card and including a programmable memory providing storage for the code of each card permitted access and of each card the permission of which is subsequently voided. An access control device of a size suitable for positioning at the location where access is being controlled and having a capability of several thousand different card codes, without requiring a central station or wiring interconnections between devices or between the device and a central station.

29 Claims, 6 Drawing Figures

PROGRAMMABLE CARD ACTUATED LOCK

BACKGROUND OF THE INVENTION

This invention relates to access control devices operated by magnetically coded cards and sometimes referred to as magnetic locks.

Magnetic locks of various types are in wide use today. The individual using the lock is provided with a card slightly larger than a business card. The card includes a sheet of magnetic material which has individually magnetized spots, with the position and polarity of the spots providing a code. To obtain access to an area, that is, to open the lock, the card holder inserts the card into a slot of a card reader. If the card is properly coded, the desired access is provided as by opening a door or a gate or the like.

There are two general types of access control systems utilizing magnetically coded cards in use at the present time. The simple system provides a single access control device or lock at each location where control is desired. The lock typically consists of a card reader about one inch by 3 inches by 3 inches. The reader is set to accept a particular code and when a card with the particular code is inserted, the reader provides an access signal which operates the door strike or door latch.

The complex system incorporates a plurality of card readers and a central control station of some nature. All of the readers are connected to the central station requiring considerable wiring. Each reader reads the code of any card inserted therein and transmits this code to the central station. The central station determines whether or not access shall be granted. The central station includes means for changing the codes of the cards which will be admitted and those which will be barred, that is, the system can be programmed and the programming can be changed at will so that access can be granted and barred without requiring the return of issued cards. With these complex systems, lost cards can be voided, employees who have quit can be barred, the hours of access can be controlled, and records can be maintained of entries and exits.

The simple system has the advantage of being small, compact, inexpensive and self-contained, with no additional wiring required. However programming and changing of the programming is very difficult and in most instances, not possible. The complex systems are designed for programming, but are expensive and complicated and require wiring interconnections between all readers and the central station.

It is an object of the present invention to provide a new and improved access control device operated by magnetically coded cards, which device is small, compact, inexpensive and reliable. A further object is to provide such a device capable of being programmed to store a large number (typically several thousand) card codes which are to be permitted access and several thousand card codes which are to be denied access, with all of the device contained in a single package incorporating the card reader and slot for card insertion. A particular object of the invention is to provide such a device which is totally self-contained and which does not require any interconnection with other readers or with a central station or other control unit.

It is another object of the invention to provide a new and improved programmer which is portable and hand-held and which may be inserted into a lock in the same manner as a card for programming the lock to introduce the code of a card to be permitted access and the code of a card the permission of which is to be voided. A further object is to provide such a programmer which can be utilized with one or a group of locks. A particular object of the invention is to provide such an access control system incorporating an electronic memory in each device or lock which can be programmed by the portable programmer to store the permit codes and void codes without requiring pin boards or patch cords or other complex arrangements.

Other objects, advantages, features and results will more fully appear in the course of the following description.

SUMMARY OF THE INVENTION

The access control device is a self-contained programmable lock operated by magnetically coded cards. The lock includes an electronic memory having a first section for storing permit codes and a second section for storing void codes, that is codes which are to be denied access, typically those which have previously been permitted access. The memory preferably is a programmable read only memory typically having storage capacity for several thousand codes. The lock is operated by inserting the magnetically coded card into a card reader which determines the presence and absence of magnetic spots on the card and provides a binary signal to the memory identifying the code of the card. If the code of the particular card inserted is stored in the permit section and not stored in the void section of the memory, the logic provides an entry signal which can be used to directly operate a door strike or otherwise provide access as desired. A programmer may be inserted into the card reader in the same manner as the coded card, and the programmer is manually operated to enter codes into the permit section of the memory and enter codes into the void section of the memory. The programmer may be manually set to a specific code and then provides an indication of whether or not this code has previously been stored in the void section or in the permit section. If not previously stored, the code can then be stored by the party operating the programmer. Each access control device is self-contained, requiring only conventional electric power connections and has the capability of permitting and denying access to thousands of differently coded cards. A master code may be utilized in the system in addition to the individual codes for each card, when desired. While each lock is an independent device, a single programmer may be utilized with a plurality of locks.

DESCRIPTION OF THE PREFERRED EMBODIMENT

Figure 1:
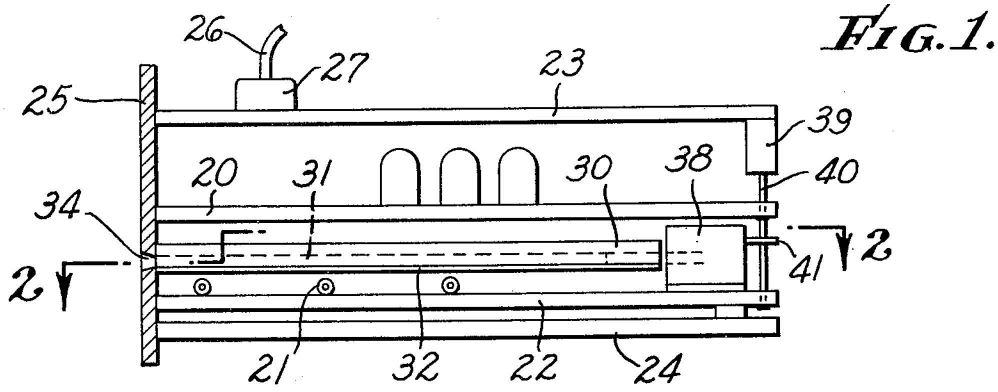
FIG. 1 is a side view of a lock or access control device with the cover or housing removed, and incorporating the presently preferred embodiment of the invention.
Figure 2:
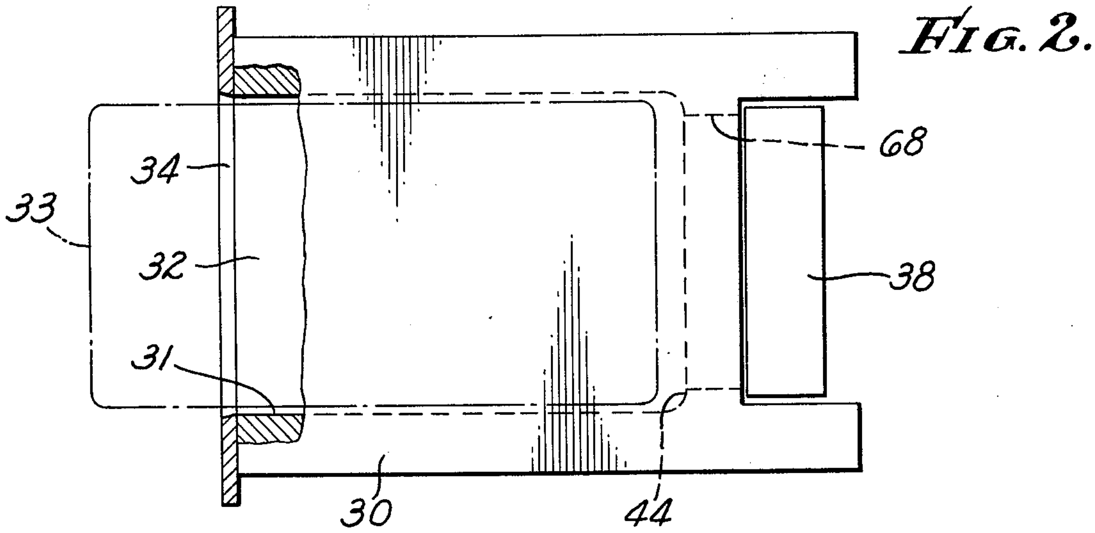
FIG. 2 is a sectional view taken along the line 2—2 of FIG. 1.

The access control device as shown in FIGS. 1 and 2 includes the card reader and associated electrical circuitry. Some of the circuitry is carried on a circuit board 20 and additional circuitry including magnetically operated reed switches 21 is carried on another circuit board 22. The circuit boards are carried between upper and lower plates 23, 24, all of which typically are carried on a face plate 25. A housing or cover (not shown) may be used to enclose the components. Electric power is provided through a cable 26 and plug 27.

Another plate 30 has a relieved portion 31 which cooperates with a plate 32 to define a slot for slidingly receiving a card 33 through an entrance opening 34 of the plate 25. An electrical connector 38 is carried on the board 22. Electrical interconnections are provided between the circuit board 20, the circuit board 22 and the connector 38, preferably by another connector 39 mounted on the plate 23, with the connector terminals 40 projecting through appropriate openings in the boards 20 and 22 and in the terminals 41 of the connector 38. The connector 39 is adapted for receiving a plug (not shown) which may be used for connecting the access control device to a remote location for monitoring and/or recording, if desired.

In operation, a magnetically coded card 33 is inserted into the slot until the card bottoms at 44. The switches 21 function as detectors for the magnetic coding of the card. A switch is provided at each location that a magnetic spot may be introduced into the card. The presence or absence of the magnetic spot is detected and the switches provide a binary output which represents the code of the card. Various magnetic card readers have been utilized in the past and can be used with the access control device of the present invention.

Figure 3:
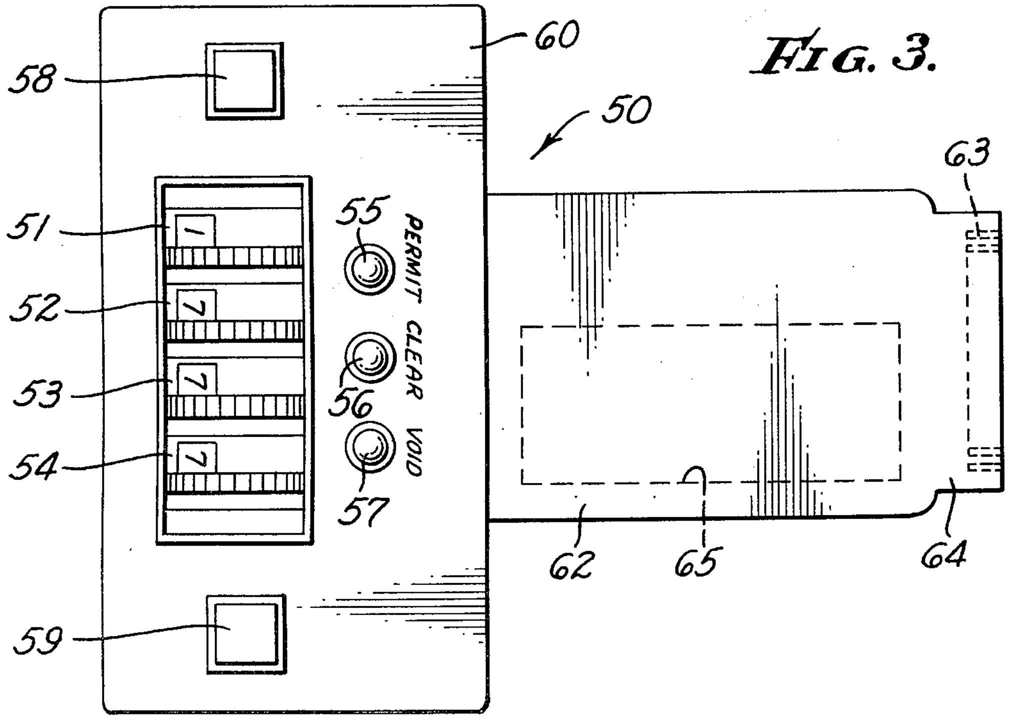
FIG. 3 is a top view of a programmer suitable for use with the lock of FIGS. 1 and 2.

A programmer 50 for use with the reader of FIGS. 1 and 2, is shown in FIG. 3. Thumb wheel switches 51, 52, 53, 54, permit, clear and void indicators 55, 56, 57, and permit and void push buttons 58, 59 are mounted in a housing 60. A plate or tab 62 having the configuration of a card is carried on and projects from the housing 60. A plurality of conductors 63 is carried on an extension 64 of the tab 62 and a piece of magnetic material 65 may be mounted in the tab 62.

In use, the programmer 50 is inserted into the slot of the reader in the same manner as a coded card, with the extension 64 of the tab moving into an extension 68 of the slot placing the conductors 63 in the connector 38 for electrically connecting the programmer into the lock. The magnetic material 65 may be encoded with a master code which enables operation of the programmer with a particular lock or set of locks.

Figure 4:
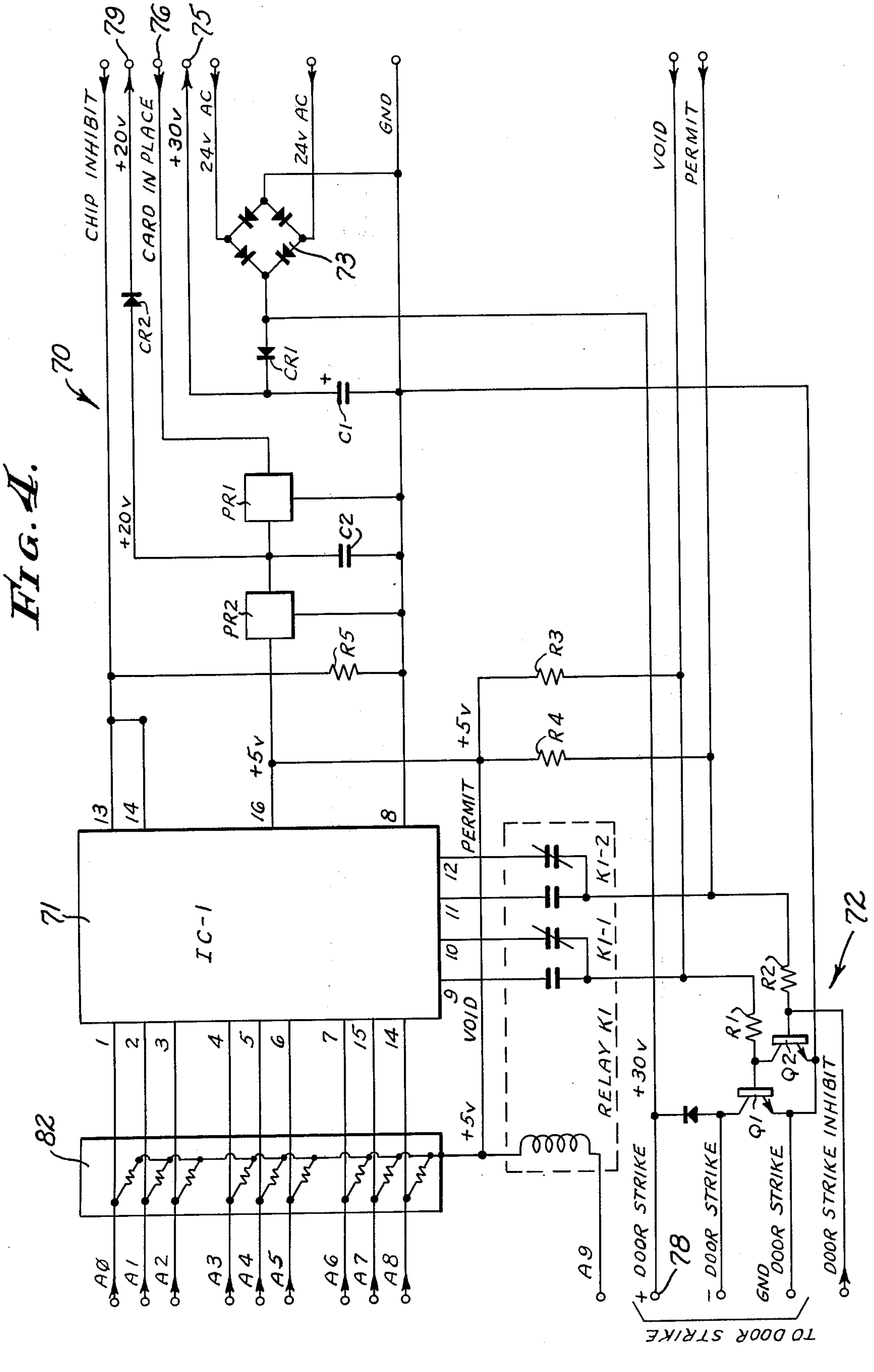
FIG. 4 is an electrical circuit diagram of the memory, logic and power supply of the lock of FIG. 1.

FIG. 4 illustrates that portion of the electrical circuitry carried on the circuit board 20. While the preferred embodiment of the invention illustrated shows the circuitry on two boards, it is readily understood that the invention is not limited to this particular configuration and other wiring configurations may be utilized as desired. The circuit of FIG. 4 includes a power circuit 70, a memory 71, and a logic circuit 72.

The specific power circuit illustrated is designed to operate with a 24 volt ac input thereby permitting low voltage wiring for the lock installation. The ac input is connected across a bridge rectifier 73 providing an output of about 30 volts through diode CR1 across capacitor C1. The rectifier output is connected to terminal 75 and through a switching circuit in the reader (FIG. 6) back to terminal 76, with the circuit being completed between terminals 75 and 76 when a card is in place in the reader and carries the appropriate master code. The rectifier output is directly connected to terminal 78 providing a relatively high current for actuation of a door strike solenoid or other device, with the diode CR1 isolating the capacitor C1.

A voltage regulator PR1 provides a 20 volt supply to terminal 79 for the programmer (FIG. 5) and another voltage regulator PR2 provides a 5 volt supply for the memory and logic of FIG. 4.

The memory 71 preferably is a programmable read only electronic memory (PROM) and various of the memories available may be used. A Fairchild 93416 is used in the specific embodiment illustrated.

Figure 5:
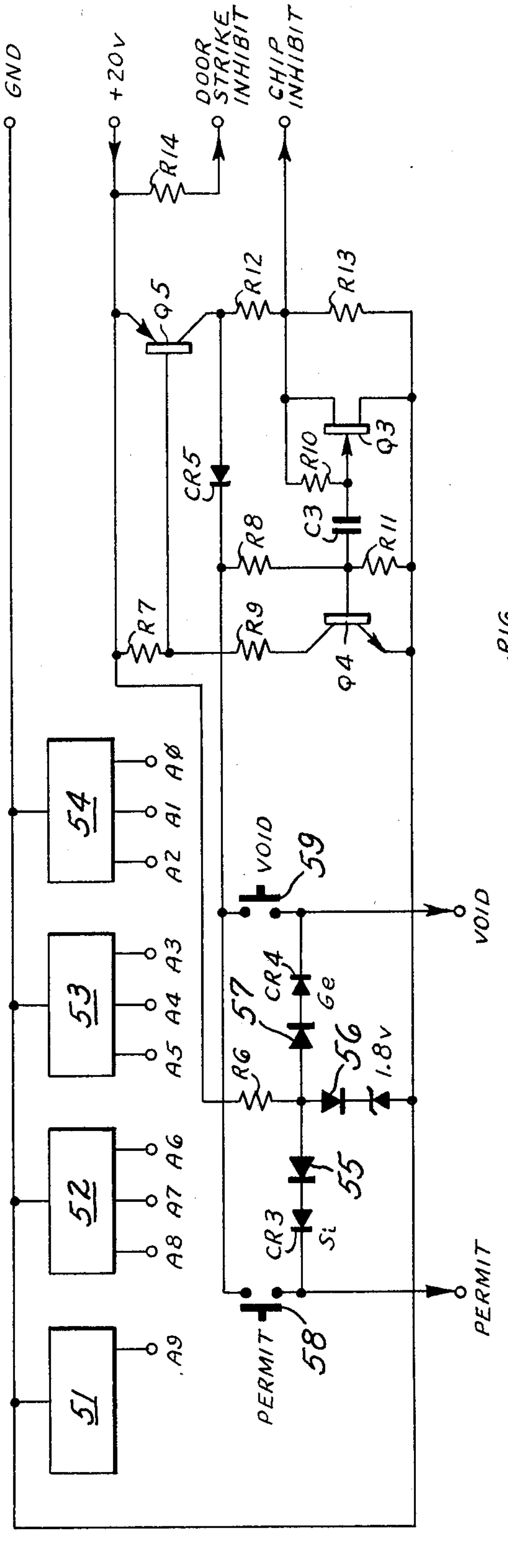
FIG. 5 is an electrical circuit diagram of the programmer of FIGS. 3.

The memory in the form of an integrated circuitchip will contain a thousand or more storage locations which may be identified as fuses or connections to circuit ground. The memory functions to select a given group of four fuses when a particular address code is presented. The address in the form of nine binary coded voltage levels is provided at the memory input terminals 1, 2, 3, 4, 5, 6, 7, 15 and 14. The selected connections or fuses are at the output terminals 9, 10, 11, 12. One section of the memory is used for permit code storage with output terminals 11, 12 and another section of the memory is used for void code storage with output terminals 9, 10. Since only one output is required for each of permit and void at any one time, a switching circuit in the form of relay K1 provides for selectively connecting outputs 9 and 11 or outputs 10 and 12 to the logic circuit 72. The relay is also controlled by the thumb wheel switch 51 of the programmer 50 (FIGS. 3 and 5).

Input terminals A0 – A8 are connected to the memory input as shown, and an SIP resistor package 82 provides a connection for each input terminal through a resistor to the five volt supply providing a reference level.

The memory is programmed in a manner to be described hereinbelow so that various of the output terminals 9–12 are connected to a reference voltage (typically circuit ground) when a specific binary code is connected at the input terminals A0 – A8. The reed switches from the card reader (FIG. 6) and the thumb wheels from the programmer (FIG. 5) are connected to the terminals A0 – A8 of FIG. 4 by the terminals 40 of the connector 39 (FIG. 1).

The logic circuit 72 controls the power to the door strike solenoid or other output device. The electrical connections to the door strike solenoid may be made through the cable 26 (FIG. 1). This circuit includes transistors Q1 and Q2. Q1 is a power transistor capable of operating the door strike solenoid, while Q2 is small as it need carry only the base current of Q1.

Initially, with no codes stored in the memory (no fuses blown), the outputs at terminals 9–12 are open (not connected to circuit ground). Under these conditions, resistors R3 and R4 pass current via resistors R1 and R2. The current through resistor R2 becomes base current for transistor Q2 which turns on and conducts the current of R1, thereby shunting the current to circuit ground rather than letting it become base current for transistor Q1. Transistor Q1 is not conducting and access is not permitted. This condition is the clear or unprogrammed state.

With a permit for a particular code programmed or stored in the memory, one fuse is blown and the permit output at pin 11 (or 12 as selected by relay K1) provides a direct path to circuit ground when the appropriate code appears at the memory input. This shunts all of the current of R4 direct to ground, bypassing R2 and Q2. Q2 will be nonconducting and the current of R3 and R1 will provide base current for Q1, turning Q1 on and providing the access signal for energizing the door strike solenoid. This condition is the permit state for the given card code or address.

When the card code or address is programmed or stored in the void section of the memory, the current of R3 is connected to circuit ground through void output terminal 9 (or 10 as selected by relay K1). This provides a shunt for R1 and Q1 thereby preventing any base current to Q1, with no access signal and no door strike solenoid current. This condition is defined as the void state and permanently prevents any use of the particular code.

Once a particular code has been entered into the void section of the programmable read only memory, that particular code cannot be permitted access again. Greater memory capacity can be obtained by utilizing memories with larger storage capability and by utilizing two or more memories connected in parallel. While a programmable read only memory is preferred, a random access memory could be utilized. However the random access memory cannot be irrevocably erased, that is, a code which has been voided can be restored in a random access memory, which provides a person having a stolen card and a programmer the capability of reintroducing the code of the stolen card into the memory. Another disadvantage of the random access memory is that the memory does not survive disturbances such as power outages, lightning strikes and the like thereby requiring additional standby equipment.

Typically an access control system will utilize a plurality of cards and sometimes a plurality of card readers. Many cards in a set will carry a master code, with each individual card also having its own code. The master code concept is not new with the present invention and of course, the present invention is not limited to the use of a master code. Typically a card will be issued to each employee with a separate code for each employee. Various access control devices at a facility may be programmed to provide specific employees access to one or more specific devices. If at any time a card is lost or stolen or the card holder is no longer entitled to access to one or more areas, the code is programmed into the void section of the control device or devices, thereby voiding the earlier granted permission to enter.

The electrical circuitry of the programmer 50 is shown in FIG. 5 and includes an addressing section comprising the switches 51–54, an indicating section including the indicators 55–57, and a control section including the unijunction transistor Q3 and the switching transistor Q5.

In the addressing section, the switches 52, 53, 54 provide outputs for the terminals A0 – A8 in binary coded octal, with each switch having eight positions 0–7. The switch 51 has two positions, providing a ground connection for the relay solenoid when in one of the positions. In operation, the switches are set to the code of the card to be programmed as a permit or a void. Other types of coding may be utilized as desired, and any number of switches may be incorporated, depending upon the capacity of the device. The function of the switches is to simulate the output of the card reader during the programming operation.

In the indicating section, the indicators 55, 56 and 57 typically are light emitting diodes. Diode 56 is connected to circuit ground through a 1.8 volt zener diode. Diode 55 is connected to the permit terminal through a silicon diode having a 0.9 volt characteristic, while diode 57 is connected to the void terminal through a germanium diode having a 0.2 volt characteristic. The particular diodes selected are not necessary, the important feature being the relative threshold presented by the three, namely that the threshold in the path for the diode 56 be relatively high and the threshold in the path for the diode 57 be relatively low, with the threshold in the path for the diode 55 being intermediately high and low values.

When the programmer is plugged in and the memory is in the clear state for the specific code set by the programmer, both the void and permit terminals are high (not grounded) and current from resistor R6 flows through the light emitting diode 56 and the 1.8 volt zener to ground, thereby providing a clear indication. When the memory is in the permit state, that is, when the selected address has been stored in the permit section of the memory, the permit terminal is connected to circuit ground through the memory and current through the resistor R6 flows through diode 55 to ground since the diode CR3 has a lower drop than the zener diode. Similarly, if the memory has a void stored for the selected address, the void terminal is at circuit ground and the current through the resistor R6 flows through the diode 57 to ground. Current through the diode 55 provides the permit indication and current through the diode 57 provides the void indication. The arrangement of the light emitting diode 55–57 and the diodes in series therewith insures that only one indication can be given at a time.

The control circuit includes an oscillator with the unijunction transistor Q3, capacitor C3, resistor R10 and resistor R11. The oscillator normally receives no power since transistors Q4 and Q5 are normally off. If either the permit push button 58 or the void push button 59 is pushed and there is no corresponding code stored in the memory (the fuse is unblown) base current through resistor R8 will turn on transistor Q4 and thereby turn on transistor Q5. If the permit or void has already been programmed in the memory, the base current path will be shunted directly to ground through the memory. When transistor Q5 switches on, power is provided to the oscillator, to the permit or void terminal as selected by the push buttons, and to the chip inhibit terminal, the latter connection being necessary for programming the memory. The power at the permit or void terminal functions to store the code in the memory (blow the appropriate fuse).

The oscillator operates for a predetermined period of time and then turns off transistor Q5 terminating the storage current to the memory. The chip inhibit signal is also terminated and the indicators 55–57 will indicate whether or not the programming operation has been completed. If the fuse has been blown, the permit or void diode will so indicate and the base current through Q4 will be terminated. If for some reason the fuses have not blown, another storage cycle will start. This store and check cycle will continue until the storage operation is complete if the push button is maintained depressed.

A current is connected to the base of transistor Q2 (FIG. 4) through resistor R14 and the door strike inhibit terminal to prevent actuation of the door strike solenoid during the programming operation. Power is provided to the programmer from terminal 79 of the power circuit (FIG. 4) with the diode CR2 inserted to prevent application of power to the memory and logic through the connector 38 for improper operation of the device.

Figure 6:
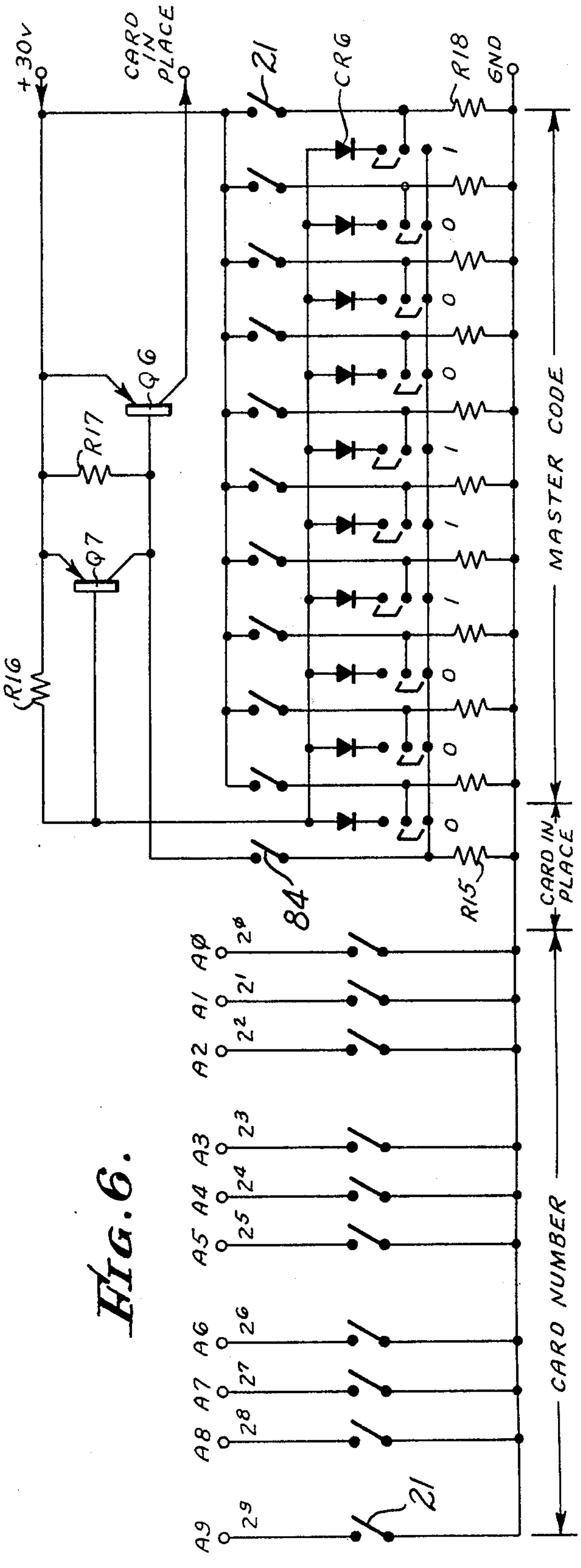
FIG. 6 is an electrical circuit diagram of the magnetic detectors and master code discriminator of the lock of FIG. 1.

In the embodiment illustrated, the reed switches 21 and the master code discriminator are carried on the circuit board 22, which is shown in FIG. 6. Ten of the reed switches are connected to the input of the memory. Another ten of the reed switches are used in the master code circuitry, while another reed switch is positioned for actuation when the card is properly in place in the reader. This card in place switch 84 provides a base current path turning on transistor Q6 when switch 84 is closed, unless shunted by the master code transistor Q7. When transistor Q6 is turned on, the 30 volts from the rectifier is connected to the voltage regulator, closing the path across terminals 75, 76 of FIG. 4.

Transistor Q7 will be turned on, inhibiting turn-on of transistor Q6 if the master code section of the inserted card or programmer does not match the master code set in the card reader.

The embodiment illustrated in FIG. 6 provides a ten bit binary master code, with a circuit comprising a switch 21, a diode CR6 and a resistor R18 for each bit. For a binary one, the diode is connected to the resistor R18, while for a binary zero, the resistor R18 is connected to the resistor R15, with the resistor R15 having a lower value than the resistor R18, typically about 1/5 the resistance. FIGS. 6 indicates the connections for a master code of 0001110001. Then when a card or programmer is inserted and closes all the reed switches in the circuits indicated by 1 and leaves open all the reed switches in the circuits marked 0, the transistor Q7 will be turned off and the transistor Q6 may be turned on by closing the reed switch 84. With the transistor Q6 turned on, power is provided to the memory and logic and to a programmer if plugged in.

Thus it is seen that the present invention provides a self-contained, programmable, magnetic card reading lock for access control. A unique master code may be incorporated in each lock which prevents cards not intended for use in a given lock from gaining access through such lock, and which also prevents programmers not intended for use in a given lock from changing the programming of the lock. Each card may have a unique card number as well as a master code and each lock may be programmed to permit access of selected cards and to prohibit or void permission of access for any selected card. The memory for cards permitted and cards voided is self-contained and permanent in the device. The hand-held portable programmer may be used to determine and indicate the state of the memory for any card code and to store permits and voids for any card code. The device is readily operated with a low voltage power supply thereby simplifying wiring connections with main power sources. Alternatively, a self-contained battery power source can be utilized. The device provides an access signal which can be used to directly power an unlocking device and/or as a control for unlocking devices or other devices as desired.

I claim:

1. In a self-contained, programmable access control device adapted for operation by a magnetically coded card, the combination of:

an electronic memory having a first section for storing permit codes, a second section for storing void codes, a multi-bit input for receiving codes, a permit output and a void output, with said memory connecting said permit and void outputs to predetermined voltage levels when predetermined multi-bit codes are connected to said input;

means for entering a code into said permit section;

means for entering a code into said void section;

means for connecting a code of a card to said memory input; and logic means having said permit and void outputs as inputs for generating an entry signal when the code of said card is stored in said first section and not stored in said second section providing said predetermined voltage level at said permit output and not at said void output.

2. An access control device as defined in claim 1 wherein said memory is a programmable read only memory and a code is permanently stored in said first section and in said second section, with access being denied to a card having a code stored in neither of said sections and in both of said sections.

3. An access control device as defined in claim 1 wherein said logic means includes a first switching circuit providing said entry signal when switched, and a second switching circuit inhibiting switching of said first switching circuit when said second switching circuit is switched, providing a three condition logic of no entry signal when the card code is in neither memory section and when it is in both memory sections, and an entry signal when the card code is in the permit section and not in the void section.

4. An access control device as defined in claim 1 wherein said logic means includes a first transistor switching circuit providing said entry signal when switched, and a second transistor switching circuit inhibiting switching of said first switching circuit when said second switching circuit is switched, with said second switching circuit connected to shunt base current of said first switching circuit and with said memory permit output connected to shunt base current of said second switching circuit and with said memory void output connected to shunt base current of said first switching circuit.

5. An access control device as defined in claim 1 wherein said logic means includes:

a first transistor switching circuit providing said entry signal when switched;

a second transistor switching circuit inhibiting switching of said first switching circuit when said second switching circuit is switched;

a first pair of resistors connected in series between a voltage source and the base of the transistor of said first switching circuit, with the junction of said resistors connected to said memory void output;

a second pair of resistors connected in series between a voltage source and the base of the transistor of said second switching circuit, with the junction of said resistors connected to said memory permit output.

6. An access control device as defined in claim 1 wherein said memory has a pair of first sections with first and second permit outputs and a pair of second sections with first and second void outputs, and including switching means for selectively connecting said first outputs and said second outputs to said logic means.

7. An access control device as defined in claim 1 including:

a card reader having a first set of magnetic detectors providing a card code and a second set of magnetic detectors providing a master code;

a power source;

switching means for connecting said power source to said memory and logic means;

a master code discriminator having a master code set therein;

first means for connecting said first set of detectors to said memory input; and second means for connecting said second set of detectors to said master code discriminator, with said discriminator providing an output to said switching means connecting said power source to said memory and logic means when the code of a card in the reader matches said master code.

8. An access control device as defined in claim 7 including another magnetic detector providing a card in place output when a card is properly positioned in said reader, with said switching means having said card in place output as an input inhibiting said switching means when a card is not properly positioned in said reader.

9. An access control device as defined in claim 1 including a card reader having means defining a slot for slidingly receiving a coded card, and a plurality of magnetic detectors positioned adjacent said slot, with said reader, memory and logic means joined in a single package.

10. An access control device as defined in claim 9 with said magnetic detectors, memory and logic means mounted on circuit boards disposed parallel to said slot.

11. An access control device as defined in claim 9 including a multi-pin connector mounted at the inner end of said slot and a programmer carrying said means for entering and having a card shaped tab for insertion into said slot with a tab extension carrying a mating member for said connector for connecting said programmer to said memory.

12. An access control device as defined in claim 1 including:

a card reader having means defining a slot for slidingly receiving a coded card and a plurality of magnetic detectors positioned adjacent said slot;

a multi-pin connector mounted at the inner end of said slot; and a programmer carrying said means for entering and having a card shaped tab for insertion into said slot with a tab extension carrying a mating member for said connector for connecting said programmer to said memory.

13. An access control device as defined in claim 1 including:

a card reader having means defining a slot for slidingly receiving a coded card and a plurality of magnetic detectors positioned adjacent said slot;

switching means for blocking operation of said device; and a plurality of master code circuits connected to a corresponding plurality of said detectors, with the code circuit outputs connected to said switching means, each of said master code circuits including means for setting a binary one or zero, with said switching means blocking operation except when a card coded to match the master code circuit settings is inserted into said slot.

14. An access control device as defined in claim 13 including a programmer carrying said means for entering and having a card shaped tab for insertion into said slot and connecting said programmer to said memory, said tab including a magnetically coded portion positioned for cooperation with those of said detectors connected to said master code circuit when said tab is positioned in said slot.

15. An access control device as defined in claim 1 including:

a card reader having means defining a slot for slidingly receiving a coded card and a plurality of magnetic detectors positioned adjacent said slot, with said detectors, memory and logic means mounted on circuit boards disposed parallel to said slot;

a multi-pin connector mounted at the inner end of said slot;

a programmer carrying said means for entering and having a card shaped tab for insertion into said slot with a tab extension carrying a mating member for said connector; and a plurality of conductors interconnecting said circuit boards and said connector.

16. An access control device as defined in claim 15 including a second multi-pin connector having a plurality of terminals projecting therefrom, with said terminals forming said plurality of interconnecting conductors.

17. An access control device as defined in claim 1 including a programmer carrying said means for entering codes into said permit and void memory sections, said programmer having:

a set of switches for simulating a coded card providing a selectable card code to said memory input;

means for connecting the output of said set of switches to said memory input;

means for generating a storage signal;

a permit switch for connecting said storage signal to said memory permit output; and a void switch for connecting said storage signal to said memory void output.

18. An access control device as defined in claim 17 wherein said storage signal generating means includes an oscillator, and a control circuit providing power to said oscillator when one of said permit and void switches is actuated while said set of switches is set to a code not stored in the corresponding section of said memory.

19. An access control device as defined in claim 17 wherein said memory is a programmable read only memory wherein storage of a selected code is indicated by connecting an output to circuit ground.

20. An access control device as defined in claim 19 including a clear indication diode connected to circuit ground through a relatively high threshold, a void indication diode connected to said memory void output through a relatively low threshold, and a permit indication diode connected to said memory permit output through a threshold of value intermediate said relatively high and low thresholds, with a power source connected to said indication diodes whereby only said void diode will indicate when it is connected to circuit ground through said memory, and only said permit diode will indicate when it is connected to circuit ground through said memory and said void diode is not so connected, and only said clear diode will indicate when neither of said void and permit diodes is so connected.

21. An access control device as defined in claim 17 wherein said storage signal generating means includes a power switching circuit with actuation of said permit switch when connected to an unstored memory location, energizing said power switching circuit providing power to said memory permit output for programming a permit in said memory.

22. An access control device as defined in claim 21 wherein said storage signal generating means includes a timer started when said power switching circuit is energized and shutting off power a predetermined time after actuation of said permit switch.

23. An access control device as defined in claim 21 wherein actuation of said void switch when connected to an unstored memory location energizes said power switching circuit providing power to said memory void output for programming a void in said memory.

24. A programmer for use with an access control device having an electronic memory with a first section for storing permit codes, a second section for storing void codes, a multi-bit input for receiving codes, a permit output and a void output, with said memory connecting said permit and void outputs to predetermined voltage levels when predetermined multi-bit codes are connected to said input, said programmer including in combination:

a set of switches for simulating a coded card providing a selectable card code to said memory input;

means for connecting the output of said set of switches to said memory input;

means for generating a storage signal;

a permit switch for connecting said storage signal to said memory permit output; and a void switch for connecting said storage signal to said memory void output.

25. A programmer as defined in claim 24 wherein said storage signal generating means includes an oscillator, and a control circuit providing power to said oscillator when one of said permit and void switches is actuated while said set of switches is set to a code not stored in the corresponding section of said memory.

26. A programmer as defined in claim 24 wherein said storage signal generating means includes a power switching circuit with actuation of said permit switch when connected to an unstored memory location, energizing said power switching circuit providing power to said memory permit output for programming a permit in said memory.

27. A programmer as defined in claim 26 wherein said storage signal generating means includes a timer started when said power switching circuit is energized and shutting off power a predetermined time after actuation of said permit switch.

28. An access control device as defined in claim 26 wherein actuation of said void switch when connected to an unstored memory location energizes said power switching circuit providing power to said memory void output for programming a void in said memory.

29. An access control device as defined in claim 24 including a clear indication diode connected to circuit ground through a relatively high impedance, a void indication diode connected to said memory void output through a relatively low impedance, and a permit indication diode connected to said memory permit output through an impedance of value intermediate said relatively high and low impedances, with a power source connected to said indication diodes whereby only said void diode will indicate when it is connected to circuit ground through said memory, and only said permit diode will indicate when it is connected to circuit ground through said memory and said void diode is not so connected, and only said clear diode will indicate when neither of said void and permit diodes is so connected.

* * * * *